Jan. 5, 1926. 1,568,040
J. BERGE
MAGNET MECHANISM FOR MAGNETIC SPEEDOMETERS
Filed April 14, 1919
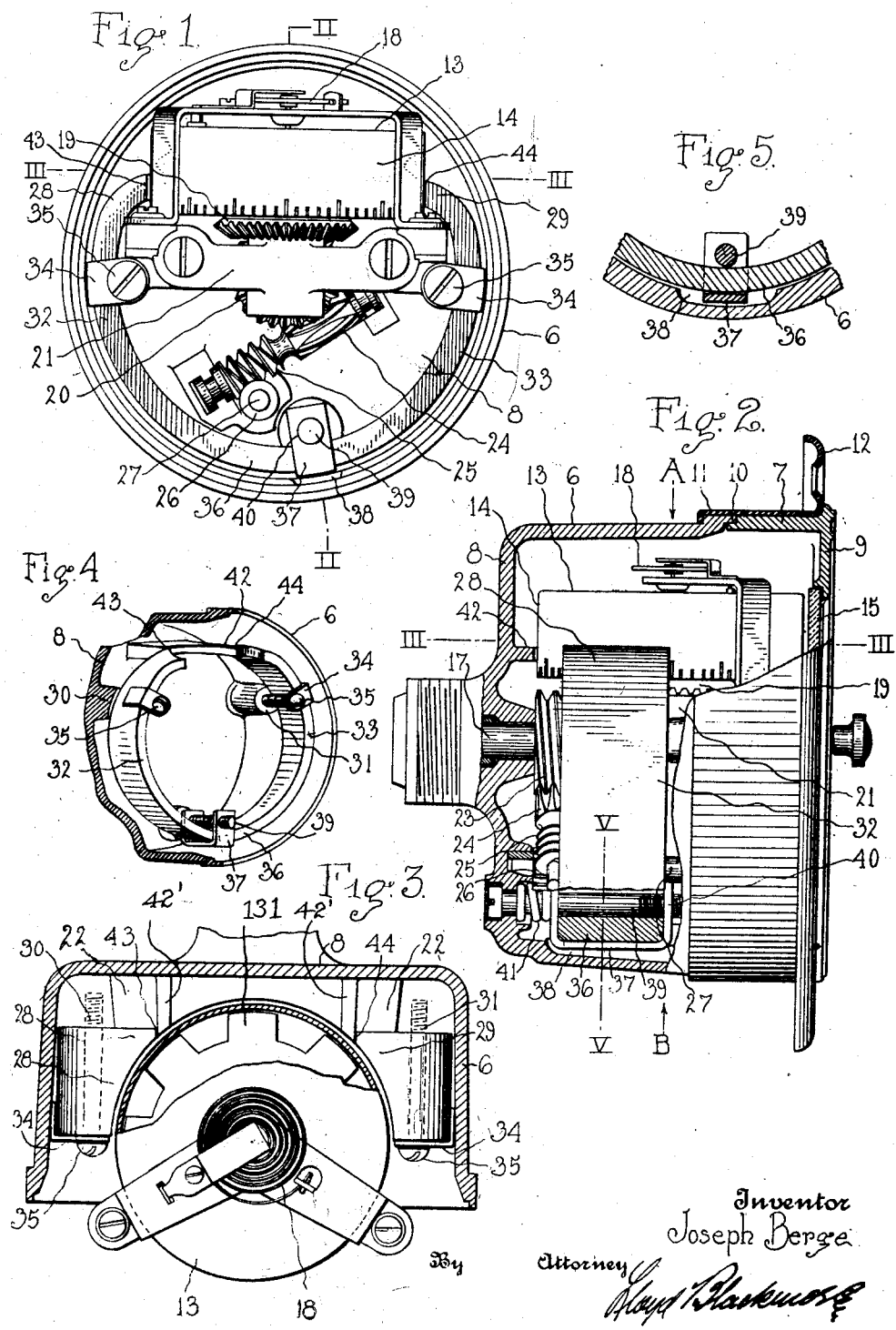
Inventor
Joseph Berge
By Attorney Patented Jan. 5, 1926.

1,568,040

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

MAGNET MECHANISM FOR MAGNETIC SPEEDOMETERS.

Application filed April 14, 1919. Serial No. 289,825.

*To all whom it may concern:*

Be it known that I, JOSEPH BERGE, a citizen of the United States, and resident of Flint, Genesee County, State of Michigan, have invented certain new and useful Improvements in Magnet Mechanism for Magnetic Speedometers, of which the following is a specification.

My invention relates to speedometers designed for use with self propelled vehicles to indicate the speed at which the same is moving, and which also ordinarily include registering or odometer mechanism for registering the distance traversed by the vehicle, and particularly to speedometers of the magnetic type or class wherein a light weight and delicately supported metallic speed cup or equivalent speed indicating member having characters to indicate the rate of movement per unit time is dragged along by the action of an armature rotating in a magnetic field in which the speed indicating member is located, the extent of the rotary or angular movement thus imparted to the speed indicating member or speed cup being dependent upon the rate of speed at which the armature is rotated by or through suitable driving mechanism from a wheel of the vehicle, and such angular movement being opposed by a spring operatively connected with said speed indicating member and acting to return the same to a zero reading when the vehicle is at rest.

This present application has to do with the magnet and elements and features associated therewith whereby the magnetic field within which the armature and speed cup of instruments of the class or type above referred to rotate, is provided, and the principal objects of my invention as disclosed herein are to provide an improved magnet for the purpose stated, and to provide improved means for supporting the said magnet within the casing of the instrument and for adjusting the same relative to the speed indicating member or speed cup and relative to the rotating armature of the instrument, so that the said magnet may be more readily adjusted and positioned relative to the armature and speed cup, and the instrument thus calibrated and made to indicate the speed of the vehicle correctly, than has heretofore ordinarily been the case in magnetic speedometers of the class or type to which my invention relates.

With the above and other objects of invention in view, my invention consists in the improved magnet mechanism for magnetic speedometers illustrated in the accompanying drawing and hereinafter described and particularly claimed, and in such variations and modifications thereof as will be obvious to those skilled in the art to which my invention relates.

In the drawing accompanying and forming a part of this specification and wherein the preferred embodiment of my invention is illustrated:

Figure 1 is a view showing the speed indicating mechanism of a magnetic speedometer in end elevation and equipped with my invention, the same being assembled within a casing section of the instrument designed to contain the said mechanism;

Figure 2 is a view partly in side elevation and partly in section upon approximately vertically disposed central planes indicated by the broken line II, II, Figure 1, extending longitudinally of the instrument, the entire casing of the instrument being shown;

Figure 3 is a view showing the speed indicating mechanism of the instrument in plan and assembled within its casing section, the casing being sectioned upon a horizontal plane indicated by the line III, III, Figures 1 and 2.

Figure 4 is a perspective view showing the magnet mechanism by itelf and assembled within the speed indicating section member of the casing, the rest of the speed indicating mechanism being omitted, and;

Figure 5 is a view showing a section upon a transverse plane indicated by the line V, V, Figure 2.

Referring now to the drawing, the external casing of the speedometer within which the various mechanisms and sets of mechanisms thereof are contained and supported in proper relation with one another may be of any form and construction, as the invention to which this present application relates is in no way concerned with the details of the casing. The casing shown, however, comprises two cup-shaped casing sections 6, 7 annular in form whereby a cylindrical hollow casing having end walls 8, 9 is provided, and within which the mechanism of the speedometer is located, the open ends of the cup-shaped section members abutting with one another along a joint at 10 and the said sections being secured together by a securing member in the form of an annular band or sleeve 11 forced onto the casing members and overlaying the joint aforesaid. Said sleeve is provided with a flange 12 whereby the instrument may be secured in place in an opening in a dash or instrument supporting board of a vehicle, and with an inwardly extending ledge at the end thereof opposite said flange, which ledge is adapted to engage a shoulder located adjacent the right-hand end of the casing section 6, as best shown in Fig. 2 to thereby more securely hold the casing members together.

The casing members 6, 7 are commonly made of a nonmagnetic metal, such as brass or aluminum, in which case the securing ring 11 will be made of iron or equivalent magnetic metal, in order to provide a magnetic shield or keeper for the instrument and preserve the accuracy thereof when for example, the same is placed in an opening in an iron or pressed steel dashboard; it being appreciated that the said ring is in place when the instrument is calibrated and adjusted, for it is forced onto the casing during the manufacture of the device and for the purpose of holding the casing members thereof together, and is not intended to be afterwards removed unless it becomes necessary to open the casing of the instrument to gain access to the interior mechanism thereof during a general overhauling and readjustment of the same. Said keeper obviously provides a path through which the stray magnetic flux not flowing through the armature flows and prevents disturbance of the magnetic field of the instrument by other masses of iron in its vicinity.

The subject matter above referred to, in so far as it concerns the structure of the casing of the instrument, that is, in so far as concerns a casing made up of two parts held together by an annular band or ring, is not claimed in this present application, as the same forms the subject matter of a separate application for patent prepared and filed by me. This present invention, however, does contemplate the presence of a magnetic shield or ring surrounding the operating parts of the instrument and located generally in the magnetic field thereof, in order that the accuracy of the instrument may not be affected when the same is used in a dash or instrument supporting board made from iron or equivalent magnetic metal.

It therefore follows that so far as this present application is concerned the magnetic shield may be provided by an element other than one which holds two casing members of the instrument together; although when the invention to which this application relates is used in connection with an instrument having a two-part casing, the parts or sections of which are secured together by an annular ring overlaying the joint between the two sections, the said ring may and preferably does form the magnetic shield of the instrument, in which case it obviously performs the double function of securing the accuracy of the instrument when used in an iron dashboard.

Located within the casing of the instrument and rotatable about an axis lying in a transverse plane indicated by the line A B, Figure 2, is a rotatable speed indicating member shown as in the form of a speed cup 13 having a depending peripheral wall 14 substantially cylindrical in form and upon which characters to indicate the rate at which the vehicle is moving are impressed, and which may be seen through a transparent window 15 carried by the end wall 9, and within this speed cup and rotating in the field of the magnet of the instrument is an armature 131, which armature is driven by a main driving shaft 17 rotatable in a bearing carried by the end wall 8, and which shaft may be driven from a wheel of the vehicle by and through any suitable driving mechanism.

The armature 131, as well also as the peripheral wall 14 of the speed indicating member or cup, being thus located in the magnetic field established by the magnet of the instrument, it follows that the speed indicating member or cup will be dragged along as the armature is rotated, the angular movement thus imparted to the speed indicating member being dependent upon the speed at which the armature is driven and such angular movement being opposed by a hair spring 18 operatively connected therewith and acting to oppose such angular movement, and to return the speed indicating member to a zero reading when the vehicle is at rest, as is usual in magnetic speedometers of the type or class to which my invention relates.

The armature of the instrument is driven from the driving shaft 17 through bevel gearing 19, 20, the armature and speed indicating member are supported by a support or bracket 21 which in turn is supported from the end wall 8 by pedestals 22, and odometer mechanism not shown is located within the casing section 7 and is driven from the shaft 17 through a gear train 23, 24, 25, 26, and an odometer driving shaft 27, which features, however, form no part of the invention to which this present application relates.

Located within the casing of the instrument and within the cup-shaped casing section 6 thereof when the casing is formed in two parts as hereinbefore explained is a stationary C-shaped or horse-shoe magnet the poles 28, 29 of which lie adjacent the peripheral wall 14 of the speed indicating member, and the faces of which poles lie between planes which extend at right angles to planes extending longitudinally of the sides and parallel with the edges of the sides of the magnet, the said pole faces being inclined toward one another and curved in conformity with the said wall 14, as best shown in Figure 3, so that the magnet may be arranged parallel with the axis of rotation of the said speed indicating member and entirely to one side of a transverse plane indicated by the line A, B, Figure 2, extending along and within which plane the said axis lies, in the embodiment of my invention illustrated.

Means are provided for moving the poles of the magnet aforesaid toward and from the periphery of the speed indicating member 13 and in a direction at right angles to the axis of rotation of the said member, to thereby vary the intensity of the magnetic field within which the armature and the speed indicating member operate in calibrating the instrument so that it will indicate the speed at which a vehicle is running correctly, which means may be provided by various elements and combinations of elements, all of which are regarded as coming within the scope of my invention, so long as the said means co-operates to move the poles of the magnet in the manner and direction hereinbefore specified.

In the embodiment of my invention illustrated the means for securing the magnet in place within the casing of the instrument so that its poles will lie adjacent the peripheral wall 14 of the speed indicating member, and for accomplishing the movement of the poles thereof toward and from the said member, comprises the following elements and features: Two privotal bearing lugs 30, 31 are located within the casing at the sides thereof, see Figure 3, and extend into the casing from the end wall 8 thereof, and the side portions 32, 33 of the magnet are held in engagement with the inner ends of the said lugs by means of clips 34 engaging the said sides, and screws 35 extending through the said clips and into threaded holes in the lugs. The location of the lugs 30, 31 is such that the points of engagement between their free inner ends and the sides of the magnet will be between the poles and the lower portion 36 remote from the poles thereof, so that when the magnet is tipped about an axis in which both points of engagement lie, and which axis extends in a direction at right angles to the sides thereof, the poles will be moved toward and away from the speed indicating member and in directions substantially at right angles to the axis of rotation of the said member. In the embodiment of my invention illustrated the pivotal lugs are located adjacent and their free ends engage the sides of the magnet at about the central portions of said sides, or somewhat above the middle of the side portions. The precise location of the lugs, however, is of secondary importance, and it will be appreciated that the nearer the poles the axis provided by the lugs and about which the magnet is tipped or rocked is located, the less will be the movement of the poles due to a given movement of the lower end of the magnet.

The lower end 36 of the magnet is moved to thereby rock or tip the magnet as a whole about the lugs 30, 31 as pivotal supports and about an axis extending through the points of contact between the said lugs and the sides thereof by means of a yoke 37 in engagement with said lower portion, and which yoke is movable along a guide 38 provided in the interior of the casing by a groove formed in the inner surface of the casing wall. The upwardly extending side arms of the yoke contact with the side edges of the magnet, as shown, and a screw 39 the head of which has a fixed bearing in the end wall 8 extends through holes in the said side arms, and is in threaded engagement with the inner of said arms at 40. A spring designated by the reference numeral 41 surrounds the shank of the screw and acts between the end wall and the other arm of the yoke to force the yoke and the lower end of the magnet toward the right, as will be understood from Figure 2 of the drawing.

The poles of the magnet are shown as guided in their movements by a lug 42 or lugs 42', 42', carried by the end wall 8 of the casing and with which the extremities of the poles contact at 43, 44, see Figures 3 and 4, in order to thereby keep the poles in proper position relative to the periphery of the speed indicating member during the calibration of the instrument and when the same is in use.

In view of the premises it will be appreciated that when the screw 39 is rotated in one direction the lower end of the magnet will be moved against the action of the spring 41, and the magnet as a whole rocked or tipped upon the lugs 30, 31 as pivotal supports and the poles thereof moved closer to the peripheral wall 14 of the speed indicating member, while rotation of the screw in a reverse direction will be accompanied by a movement of the lower end of the magnet in a reverse direction, thus moving the poles thereof away from the said speed indicating member.

After the magnet has been properly adjusted and the instrument calibrated so as to read correctly, the same is sealed to prevent unauthorized persons from disturbing the calibration thereof, this end being preferably accomplished by flowing solder into the recess in which the head of the magnet adjusting screw 39 lies and about the same, thereby preventing the screw from being turned.

Having thus described and explained my invention, I claim and desire to secure by Letters Patent:

1. In a speedometer of the class described, a rotatable speed indicating member cup shaped in form and having a speed indicating scale upon its peripheral wall; a stationary magnet the poles of which are movable toward and from the peripheral wall of said speed indicating member and in a direction at right angles to the axis of rotation thereof, so as to vary the length of the air gap between the pole faces of said poles and the periphery of said speed indicating member; means for adjusting said magnet to thereby move the poles thereof in the direction aforesaid; and means for holding said magnet in fixed relation to said speed indicating member after the position thereof has been properly adjusted by said adjusting means.

2. In a speedometer of the class described, a rotatable speed indicating member cup shaped in form and having a speed indicating scale upon its peripheral wall; a stationary magnet arranged parallel with the axis of rotation of said speed indicating member and the poles of which are movable toward and from the peripheral wall of said member and in a direction at right angles to the axis of rotation thereof, to thereby vary the air gap between the pole faces of said poles and the periphery of said speed indicating member; means for adjusting said magnet to thereby move the poles thereof in the direction aforesaid; and means for holding said magnet in fixed relation to said speed indicating member after the position thereof has been properly adjusted by said adjusting means.

3. In a speedometer of the class described, a suitable casing; a rotatable cup shaped speed indicating member located within said casing and having a speed indicating scale upon its periphery; a stationary C-shaped magnet secured in place within said casing and the poles of which are movable toward and from the periphery of said speed indicating member and in a direction at right angles to the axis of rotation thereof, to thereby vary the length of the air gap between the pole faces of said poles and the periphery of said speed indicating member; means for adjusting said magnet to thereby move the poles thereof in the direction aforesaid; and means for holding said magnet in fixed relation to said speed indicating member after the position thereof has been properly adjusted by said adjusting means.

4. In a speedometer of the class described, a suitable casing; a rotatable cup shaped speed indicating member located within said casing and having a speed indicating scale upon its periphery; a stationary magnet C-shaped in form secured in place within said casing and arranged parallel with the axis of rotation of said speed indicating member, and the poles of which are movable toward and from the periphery of said member to thereby vary the air gap between the pole faces of said poles and the periphery of said speed indicating member; means for adjusting said magnet to thereby move the poles thereof in the direction aforesaid; and means for holding said magnet in fixed relation to said speed indicating member after the position thereof has been properly adjusted by said adjusting means.

5. In a speedometer of the class described, a rotatable speed indicating member cup-shaped in form and having a substantially cylindrical peripheral wall, and a stationary magnet arranged parallel with the axis of rotation of said speed indicating member and to one side of a plane extending along the said axis, and the poles of which magnet are movable toward and from the peripheral wall of said member, and in a direction at right angles to the axis of rotation thereof.

6. In a speedometer of the class described, a suitable casing; a rotatable speed indicating member located within said casing and which member is cup-shaped in form and has a substantially cylindrical peripheral wall; and a stationary magnet secured in place within said casing and arranged parallel with the axis of rotation of said speed indicating member and to one side of a plane extending along said axis, and the poles of which magnet are movable toward and from the peripheral wall of said member, and in a direction at right angles to the axis of rotation thereof.

7. In a speedometer of the class described, a suitable casing; a rotatable speed indicating member located within said casing; a stationary horse-shoe magnet secured in place within said casing and arranged parallel with the axis of rotation of said speed indicating member; means whereby said magnet may be tipped about an axis extending substantially at right angles to the sides thereof, to thereby move the poles of said magnet toward and from said speed indicating member; and rotating magnetic means disposed adjacent said speed indicating member and adapted to impart angular movement thereto.

8. In a speedometer of the class described, a suitable casing; a rotatable speed indicating member located within said casing and which member is cup-shaped in form and has a substantially cylindrical peripheral wall; a stationary horse-shoe magnet secured in place within said casing and arranged parallel with the axis of rotation of said speed indicating member and to one side of a plane extending along said axis; means for tipping said magnet about an axis extending substantially at right angles to the sides thereof, to thereby move the poles of said magnet toward and from the peripheral wall of said speed indicating member; and a rotating armature located within said speed indicating member.

9. In a speedometer of the class described, a rotatable speed indicating member, a stationary magnet arranged parallel with the axis of rotation of said speed indicating member and the poles of which are movable toward and from the periphery of said member and in a direction at right angles to the axis of rotation thereof, to thereby vary the air gap between said poles and said speed indicating member, and means engaging with the said poles to guide them in their movements.

10. In a speedometer of the class described, a suitable casing, a rotatable speed indicating member located within said casing, a stationary magnet secured in place within said casing and arranged parallel with the axis of rotation of said speed indicating member, and the poles of which are movable toward and from said member and in a direction at right angles to the axis of rotation thereof, and guiding means carried by said casing and with which the poles of said magnet engage to thereby guide said poles in their movements.

11. In a speedometer of the class described, a suitable casing, a rotatable speed indicating member located within said casing, a stationary horse-shoe magnet secured in place within said casing and arranged parallel with the axis of rotation of said speed indicating member, means for tipping said magnet about an axis extending substantially at right angles to the sides thereof, to thereby move the poles of said magnet toward and from said speed indicating member, guiding means carried by said casing and with which the poles of said magnet engage to thereby guide said poles in their movements; and rotating magnetic means arranged adacent said speed indicating member and adapted to impart angular movement thereto.

12. In a speedometer of the class described, a suitable casing, a rotatable speed indicating member located within said casing, a stationary horse-shoe magnet located within said casing and arranged parallel with the axis of rotation of said speed indicating member, two pivotal bearing lugs located within said casing and adjacent the central portions of the sides of said magnet, means for holding the sides of said magnet in engagement with said lugs, means for tipping said magnet about the said lugs as pivotal supports to thereby move the poles thereof toward and from said speed indicating member, and magnetic means including a rotating member adapted to impart angular movement to said speed indicating member.

13. In a speedometer of the class described, a suitable casing, a rotatable speed indicating member located within said casing, a stationary horse-shoe magnet located within said casing and arranged parallel with the axis of rotation of said speed indicating member, two pivotal bearing lugs located within said casing and adjacent the central portions of the sides of said magnet, means for holding the sides of said magnet in engagement with said lugs, means for tipping said magnet about the said lugs as pivotal supports to thereby move the poles thereof toward and from said speed indicating member, guiding means carried by said casing and with which the poles of said magnet engage to thereby guide said poles in their movements, and a rotating armature located adacent said speed indicating member.

14. In a speedometer of the class described, a suitable casing, a rotatable speed indicating member located within said casing, a stationary horse-shoe magnet located within said casing and arranged parallel with and to one side of a plane extending along the axis of rotation of said speed indicating member, two pivotal bearing lugs located within said casing and adjacent the central portion of the sides of said magnet, means for holding the sides of said magnet in engagement with said lugs, means in operative engagement with the portion of said magnet remote from the poles thereof for tipping said magnet about said lugs as pivotal supports, to thereby move the poles thereof toward and from said speed indicating member, and rotating magnetic means arranged adjacent said speed indicating member and adapted to impart angular movement thereto.

15. In a speedometer of the class described, a suitable casing, a rotatable speed indicating member located within said casing, a stationary horse-shoe magnet located within said casing and arranged parallel with and to one side of a plane extending along the axis of rotation of said speed indicating member, two pivotal bearing lugs located within said casing and adjacent the central portions of the sides of said magnet, means for holding the sides of said magnet in engagement with said lugs, a screw operatively connected with the portion of said magnet remote from the poles thereof and having a fixed bearing in said casing whereby the portion aforesaid may be moved in one direction, a spring operatively associated with said magnet for moving the same in reverse direction, and rotating magnetic means arranged adjacent said speed indicating member and adapted to impart angular movement thereto.

16. In a speedometer of the class described, a suitable casing, a rotatable speed indicating member located within said casing, a stationary horse-shoe magnet located within said casing and arranged parallel with and to one side of a plane extending along the axis of rotation of said speed indicating member, two pivotal bearing lugs located within said casing and adjacent the central portions of the sides of said magnet, means for holding the sides of said magnet in engagement with said lugs, a yoke in engagement with the portion of said magnet remote of the poles thereof, a screw in operative engagement with said yoke and having a fixed bearing in said casing, a spring surrounding said screw and acting between said casing and said yoke, and rotating magnetic means arranged adjacent said speed indicating member and adapted to impart angular movement thereto.

17. In a speedometer of the class described, a suitable casing, a rotatable speed indicating member located within said casing, a stationary horse-shoe magnet located within said casing and arranged parallel with and to one side of a plane extending along the axis of rotation of said speed indicating member, two pivotal bearing lugs located within said casing and adjacent the central portions of the sides of said magnet, means for holding the sides of said magnet in engagement with said lugs, a yoke in engagement with the portion of said magnet remote from the poles thereof and movable along a guide provided for it in said casing, a screw in operative engagement with said yoke and having a fixed bearing in said casing, a spring surrounding said screw and acting between said casing and said yoke, and rotating magnetic means arranged adjacent said speed indicating member and adapted to impart angular movement thereto.

18. In a speedometer of the class described, a rotatable speed indicating member rotating magnetic means driven from an external source and adapted to operate said speed indicating member, and an annular sleeve or band surrounding said magnetic means and said speed indicating member and made from iron or equivalent magnetic material.

19. In a speedometer of the class described, a rotatable speed indicating member, an annular sleeve or band surrounding said speed indicating member and made from a magnetic material, and a stationary magnet, the poles of which are movable bodily toward and away from and in a direction at right angles to the axis of rotation of said speed indicating member.

20. In a speedometer of the class described a suitable casing, a rotatable speed indicating member located within said casing, an annular sleeve or band secured in a fixed position relative to and extending about the exterior of said casing and surrounding said speed indicating member, and which band is made from iron or equivalent magnetic material, and rotating magnetic means driven from an external source and adapted to impart angular movement to said speed indicating member.

21. In a speedometer of the class described, a suitable casing, a rotatable speed indicating member located within said casing, an annular sleeve or band secured in a fixed position relative to said casing and surrounding said speed indicating member, and which band is made from a magnetic material, and a stationary magnet secured in place within said casing and the poles of which are movable bodily toward and away from and in a direction at right angles to the axis of rotation of said speed indicating member.

22. In a speedometer of the class described, a suitable casing, a rotatable speed indicating member located within said casing, an annular sleeve or band secured in a fixed position relative to said casing and surrounding said speed indicating member, and which band is made from a magnetic material, and a stationary magnet secured in place within said casing arranged parallel with the axis of rotation of said speed indicating member, and the poles of which are movable toward and from the periphery of said member and in a direction at right angles to the axis of rotation thereof.

23. In a speedometer of the class described, a suitable casing, a rotatable speed indicating member located within said casing, an annular sleeve or band secured in a fixed position relative to said casing and surrounding said speed indicating member, and which band is made from a magnetic material, a stationary horse-shoe magnet secured in place within said casing and arranged parallel with the axis of rotation of said speed indicating member, and means for tipping said magnet about an axis extending substantially at right angles to the sides thereof.

24. In a speedometer of the class described, the combination with a rotatable armature, of a C-shaped magnet the poles of which are movable toward and from the periphery of said armature to thereby vary the length of the air gap between said parts and calibrate the instrument.

25. In a speedometer of the class described and in combination with a rotatable armature the axis of rotation of which is fixed, of an annular C-shaped magnet the poles of which are movable toward and from the periphery of said armature to thereby vary the length of the air gap between said parts and calibrate the instrument.

26. In a speedometer of the class described, the combination with a rotatable armature, of a magnet tiltable relative to said armature to thereby calibrate the instrument, and means for tilting said magnet to thereby move the poles thereof toward and away from the periphery of said armature.

27. In a device of the class described, the combination with a rotatable armature, of a magnet substantially C-shaped in form, said magnet being tiltable to thereby vary the position of its poles relative to the armature, and means for tilting said magnet to thereby move the poles thereof toward and away from the periphery of said armature.

In testimony whereof I affix my signature.

JOSEPH BERGE.